United States Patent
Ramalingam et al.

(10) Patent No.: US 12,375,138 B2
(45) Date of Patent: Jul. 29, 2025

(54) RANK FILTERING AND GRACEFUL RANK SWITCHING IN BASE STATION

(71) Applicant: Mavenir Systems, Inc., Richardson, TX (US)

(72) Inventors: Manoharan Ramalingam, Bengaluru (IN); Pu Yao, Beijing (CN)

(73) Assignee: Mavenir Systems, Inc., Richardson, TX (US)

( * ) Notice: Subject to any disclaimer, the term of this patent is extended or adjusted under 35 U.S.C. 154(b) by 0 days.

(21) Appl. No.: 18/327,346

(22) Filed: Jun. 1, 2023

(65) Prior Publication Data

US 2023/0318671 A1    Oct. 5, 2023

Related U.S. Application Data

(63) Continuation of application No. PCT/CN2020/133505, filed on Dec. 3, 2020.

(51) Int. Cl.
*H04L 1/02*        (2006.01)
*H04B 7/0456*     (2017.01)

(52) U.S. Cl.
CPC ................. *H04B 7/0486* (2013.01)

(58) Field of Classification Search
CPC .......... H04B 7/0486; H04B 7/0632; H04B 7/0452; H04B 7/0602; H04L 5/0057; H04L 1/0003; H04L 27/2601; H04W 24/10; H04W 88/02; H04W 52/20; H04W 72/563
USPC ........................ 375/267, 260, 262
See application file for complete search history.

(56) References Cited

U.S. PATENT DOCUMENTS

| | | | |
|---|---|---|---|
| 2013/0033989 A1 | 2/2013 | Barbieri et al. | |
| 2015/0092708 A1 | 4/2015 | Su et al. | |
| 2021/0344399 A1* | 11/2021 | Levy | H04L 5/0053 |
| 2022/0278728 A1* | 9/2022 | Vankayala | H04B 7/0417 |
| 2023/0217290 A1* | 7/2023 | Guo | H04L 5/0073 370/329 |

(Continued)

FOREIGN PATENT DOCUMENTS

| | | |
|---|---|---|
| CN | 102412942 A | 4/2012 |
| EP | 3249826 | 11/2017 |
| WO | 2013095236 A1 | 6/2013 |

OTHER PUBLICATIONS

International Preliminary Report on Patentability for corresponding international patent application PCT/CN2020/133505; 4 pages, dated May 30, 2023.

(Continued)

*Primary Examiner* — Khai Tran
(74) *Attorney, Agent, or Firm* — Ruggiero McAllister & McMahon LLC

(57) ABSTRACT

A method which i) segregates UEs to different categories of "conforming" and "nonconforming", and ii) performs rank indicator (RI) filtering and/or switching based on the specific category is provided. Rank indicator (RI) filtering is performed in a SINR-specific manner, e.g., when SINR is low, the rank filtering is performed in such a way to always give an output of 1 or 2, not more. In addition, the Modulation and Coding Scheme (MCS) assigned for a PDSCH is adjusted when the rank switching is performed, thereby achieving graceful rank switching. Furthermore, Outer Loop Rate Control (OLRC) optimization is provided in response to rank switching.

18 Claims, 2 Drawing Sheets

(56) References Cited

U.S. PATENT DOCUMENTS

2023/0239924 A1* 7/2023 Yao ...................... H04W 72/23
                                                    370/329
2023/0421301 A1* 12/2023 Liu ...................... H04L 1/0025
2024/0137937 A1* 4/2024 Matsumura ........... H04L 5/0023

OTHER PUBLICATIONS

Written Opinion of the International Searching Authority for corresponding international patent application PCT/CN2020/133505; 3 pages, dated Sep. 3, 2021.
International Search Report for corresponding international patent application PCT/CN2020/133505; 3 pages, dated Sep. 3, 2021.
Huawei"Analysis of Closed-Loop Downlink MIMO Rank Adaptation with Received Power Imbalance" 3GPP TSG RAN WGA meeting #66-112046, Aug. 26, 2011.
Extended European Search Report for corresponding European Patent Application EP20963917.8, 6 pages, dated Sep. 19, 2024.

* cited by examiner

RANK FILTERING AND GRACEFUL RANK SWITCHING IN BASE STATION

CROSS REFERENCE TO RELATED APPLICATIONS

This application is a continuation of International Application PCT/CN2020/133505 filed Dec. 3, 2020, the entire contents of which are incorporated herein by reference

BACKGROUND OF THE DISCLOSURE

1. Field of the Disclosure

The present disclosure relates to systems and methods for rank filtering and switching in wireless networks, and relates more particularly to rank filtering and switching for $4^{th}$-Generation (4G) and $5^{th}$-Generation (5G) based mobile networks.

2. Description of the Related Art

The term Rank Indicator is derived from the mathematical term Rank Index, and Rank Indicator ("RI") is a type of UE measurement that reports Rank Index. Depending on the instructions from the network (e.g., LTE, 5G RAN, MIMO, etc.), UE may periodically or aperiodically measure RI and report it to Network. RI is an indicator showing how well multiple antennas (e.g., for MIMO) work. Each of the multiple antennas (e.g., each antenna in MIMO configuration) is working well if the signal from each antenna has no correlation to signals from other antennas, i.e., no correlation among the signals implies no interference among the signals.

Maximum RI value is very closely related to the number of antennas. Maximum RI is the same as the number of antennas on each side of a link if the number of Transmit (Tx) antennas and Receiver (Rx) antennas is the same. If the number of Tx and Rx are different, the one with fewer antennas represents the Maximum achievable RI. Maximum RI means no correlation between the antennas, no interference among the antennas, and best possible performance. For example, in the case of 2×2 MIMO, the RI value can be 1 or 2. The value 2 in this example case implies no correlation between the antennas, no interference among the antennas, and best possible performance. The value 1 in this example case implies that the signals from the two Tx antennas are perceived by the UE to be a single signal from a single antenna, i.e., not optimum performance. Therefore, in practical terms, the Rank Indicator is the number of independent communication channels, or how well a MIMO communication works. In the example of a UE communicating with an eNB with 2×2 MIMO configuration: i) if the UE reports RI of "2", it implies that the 2×2 MIMO is performing in a true MIMO fashion, i.e., 2 independent communication channels; ii) if the UE reports RI of "1", it implies that the communication is going on as if it is with single antenna, and the 2×2 MIMO is not performing with the best efficiency.

If i) the reported RI is selected inaccurately in the UE side, ii) the reported RI is used blindly by the base station, both of spatial multiplexing and link adaptation would be unreliable in downlink transmissions. Rank computation in the UE side involves a proprietary algorithm which, for many mobile UEs, is susceptible to inaccurate RI computation. Therefore, robust network operation requires the ability to handle UEs which report inaccurate RIs, which means there is a need for: i) rank filtering (i.e., filtering of RI) in the base station side as a protection mechanism to minimize DL Block Error Rate (BLER) and achieve better spectral efficiency compared to adapting the rank blindly; and ii) graceful rank switching (the mechanism in eNB/gNB by which, based on the UE RI report, the MIMO rank is switched from one to another for a PDSCH transmission) to avoid the sharp drop in throughput during the rank switching. As used in the present disclosure, "rank filtering" refers to applying at least one condition to the UE-reported RI and adjusting (switching) the reported RI to a different rank based on whether the condition is satisfied.

SUMMARY OF THE DISCLOSURE

The present disclosure provides example embodiments of rank filtering on the base station side (e.g., at eNB) to achieve, e.g., the following: i) minimize DL BLER; ii) improve throughput in the operator networks; iii) stabilize the throughput curve (i.e., avoids sharp ups and downs in the throughput curve); and iv) improved spectral efficiency.

An example embodiment of the present disclosure provides a method (e.g., performed at or on the base station side) which i) segregates UEs to different categories, and ii) performs rank filtering and/or switching based on the specific category.

An example embodiment of the present disclosure provides a method which provides SINR-specific rank filtering. For example, when SINR is low, the rank filtering according to the present disclosure is performed in such a way to always give an output rank of 1 or 2, not more.

An example embodiment of the present disclosure provides a method in which Outer Loop Rate Control (OLRC) optimization is provided in response to rank switching, which can occur as a result of rank filtering.

An example embodiment of the present disclosure provides a method in which graceful rank switching is achieved, e.g., using Modulation and Coding Scheme (MCS). According to an example embodiment of the graceful rank switching, the MCS assigned for a PDSCH is adjusted when the rank switching is performed, e.g., in a 4×4 MIMO system, among the possible ranks of 1,2,3,4, in one TTI the eNB/gNB uses rank 1, while in another TTI the eNB/gNB switches to rank 2.

An example embodiment of the present disclosure provides a method in which successful transmission of higher MIMO rank PDSCH in different SINR conditions is ensured.

An example embodiment of the present disclosure provides a method in which the UEs are segregated into two categories, i.e., "Conforming UEs" and "Nonconforming UEs" categories, and the rank filtering is performed differently based on the category. In an example embodiment, conforming UEs are subjected to only "common rank filtering", while nonconforming UEs are subjected to an additional, different rank filtering technique of "Nonconforming UE-specific rank filtering".

An example embodiment of the present disclosure provides a method which can handle both UEs with 2Rx or 4Rx (receive antennas) based on the UE capability, to support both 4×2 and 4×4 MIMO.

An example embodiment of the present disclosure provides a method which is compatible with Two Transmit Two Receive Antennas (2T2R) eNB/gNB and 2×2 MIMO capability also.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified. For a better understanding, reference will be made to the following detailed description, which is to be read in association with the accompanying drawings.

DETAILED DESCRIPTION OF THE EMBODIMENTS

According to an example embodiment of the method according to the present disclosure, the UEs are categorized into two categories, "conforming UEs" and "nonconforming UEs", and rank filtering is performed differently depending on the specific category. "Conforming UEs" are defined as UEs which report correlated RI and Channel Quality Indicator (CQI), and RI computation in this case is assumed to be sufficiently good quality ("conforming"). However, even for "conforming UEs", the reported RI and/or CQI can be affected by computation error and/or interference, for which a compensating mechanism needs to be provided. "Nonconforming UEs" are defined as UEs which report uncorrelated RI and CQI, and RI computation in this case is assumed to be of bad quality ("nonconforming"), i.e., RI is incorrectly computed, so a compensating mechanism needs to provided.

Figure 1:
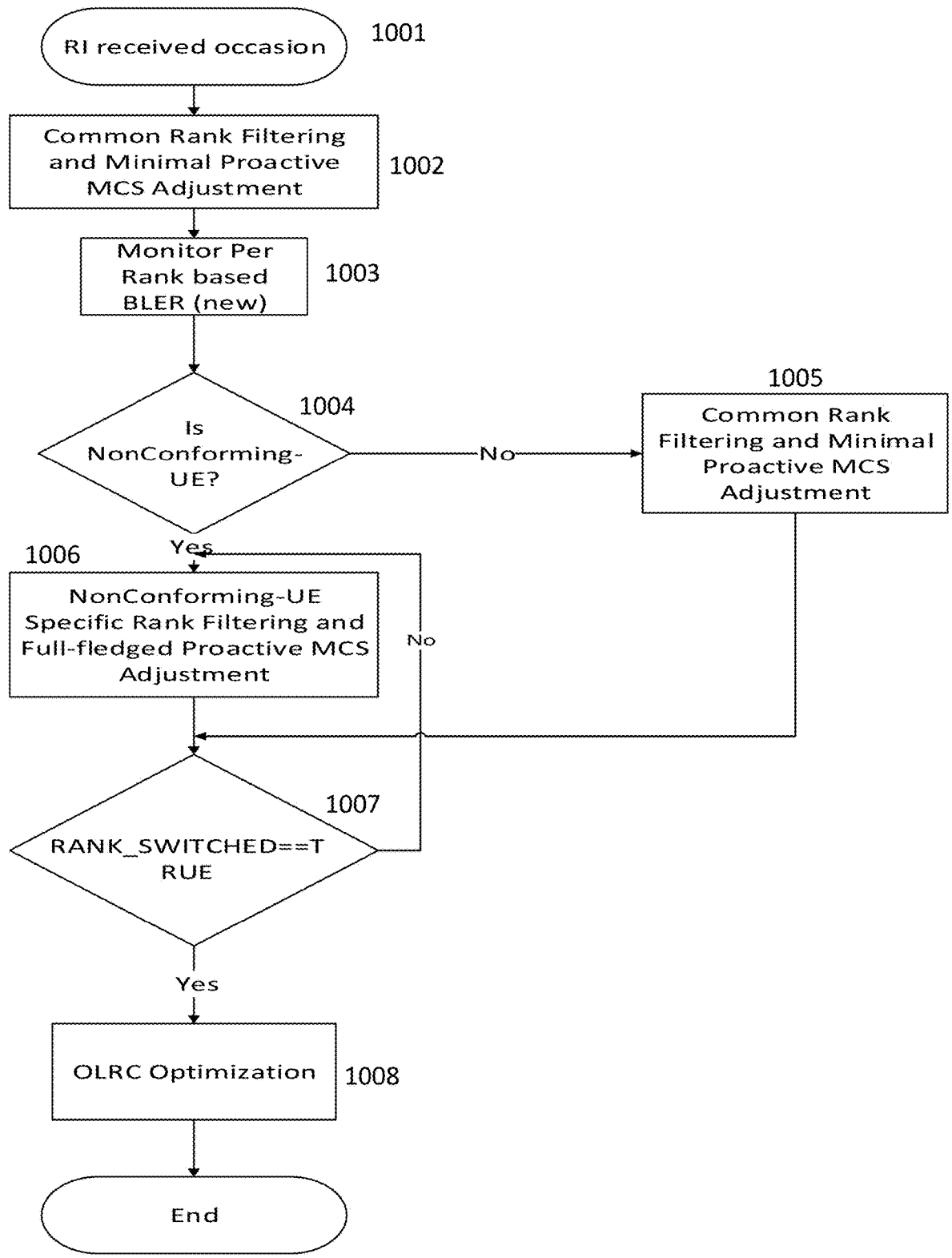
FIG. 1 is a flowchart illustrating the steps of an example method according to the present disclosure.

FIG. 1 is a flowchart illustrating the steps of an example method according to the present disclosure. As a first step, shown at block 1001, the RI will be received periodically from the UEs in eNB/gNB. The TTI in which the RI is received is called "RI-received occasion" (also referred to as "RI occasion"). As shown at block 1002, the second step is to apply common rank filtering and Minimal Proactive MCS Adjustment technique (hereinafter collectively referred to as "Minimal Proactive MCS Adjustment") common to all UEs. The UEs are not segregated as Conforming or Nonconforming UEs at this stage, and all UEs are treated the same at this stage. The third step, shown at block 1003, is to monitor per-rank-based BLER for each UE over a period, the logic for which step is discussed in detail in the subsequent sections. In the fourth step, shown at block 1004, the per-rank-based BLER for each UE is used to determine whether the UE is conforming or nonconforming UE. At block 1005, if the UE is determined to be a conforming UE, the common rank filtering and Minimal Proactive MCS Adjustment logic is continued to be applied for the particular UE. At block 1006, if the UE is determined to be a nonconforming UE, the new Nonconforming UE-specific rank filtering and Full-fledged Proactive MCS Adjustment technique (hereinafter collectively referred to as "Full-fledged MCS Adjustment") according to the present disclosure is applied. Next, at block 1007, if the UE (either conforming UE from block 1005 or nonconforming UE from block 1006) is switching from a lower rank to a higher rank, then "OLRC Optimization" logic can be applied.

The motivation for using "Common Rank Filtering" is to filter the rank (i.e., RI) without any performance degradation for both the conforming UEs and nonconforming UEs. It is used in two stages: i) Stage 1, which is when a UE is not categorized as conforming or nonconforming UE; and ii) Stage 2, which is after the UE categorization, when the UE is identified as Conforming UE. In addition, two conditions should be noted in connection with the Common Rank Filtering: i) Rank 1 and Rank 2 are not filtered when the UE is operating in QPSK modulation or low SINR in general; and ii) there is no Rank filtering when the UE is operating in 16QAM and 64QAM modulation or high SINR in general. The above-mentioned conditions i) and ii) help to track the per-rank-BLER based on reported Rank, to identify the nonconforming UEs, as explained in further detail in subsequent sections. Common Rank Filtering does not degrade performance for the conforming UEs and nonconforming UEs. Nonconforming UEs can experience BLER due to no rank filtering in 16QAM and 64QAM, and no rank 2 filtering in QPSK. The performance is improved once Full-fledged MCS Adjustment is applied.

Common rank filtering (applicable for both conforming and nonconforming UEs) will be described herein. As a first step, it is determined whether the following condition is met:
Condition #1: If OLRC applied iMcs is QPSK, then (CW0 iMcs+CW1 iMcs)/2<=QPSK Range (for LTE: iMcs 0 to 9 for 64QAM MCS table, or iMcs 0 to 4 for 256QAM MCS table)

This condition refers to OLRC applied iMcs/iTbs which is available in the beginning of the scheduling/Rank Filtering. Satisfaction of this condition will be determined before the "Minimal Proactive MCS Adjustment" step. This condition can be done in SINR or iMCS or iTbs domain.

As a second step, it is determined whether the following condition is met:
Condition #2: if Condition #1 is satisfied and received Rank>=3, then
Rank 1 and 2 are admitted without (filtering) restriction.

Next, for TTI in which the RI is received ("RI-received occasion"), the following can be performed if Condition #1 and Condition #2 are met:

A) Perform BR filtering for the Rank received from the UE to produce FILTERED_RI. For example, co-efficient for the IIR filter can be 0.2, and Rank filter is initialized to 1.

B) Calculate Rounded filtered RI: ROUNDED_FILTERED_RI=floor(FILTERED_RI+ 0.5)

C) If ROUNDED_FILTERED_RI>=3 (for 4RX UE with MAX_RANK=4) or RI>=2 (for 2RX UE with MAX_RANK=2), reset the RI to 1 (rank threshold is 2), i.e.,

ROUNDED_FILTERED_RI=1, so in QPSK Ranks 3 and 4 are never allowed.

D) FINAL_RI=Min(ROUNDED_FILTERED_RI, UE reported RI), to avoid choosing the higher rank than UE reported RI.

For TTI in which the RI is not received ("non-RI occasion"), the FINAL_RI calculated in the RI-received occasion is reused, and no new calculation is performed.

"Minimal Proactive MCS Adjustment" for RI-received occasions is described in detail in this section. This technique is: i) applied for all UEs and Rank>=2; and ii) valid for both one or two code words CQI case.

A) For QPSK (with Rank Filter):
When the current FINAL_RI>previous FINAL_RI and overall (OLRC) BLER is >10% (TARGET_BLER+ offset), reduce OLRC filtered MCS by one index (if it is not in the lowest index).
A1) This case applies for the single code word case, when the Rank is switched from 1 to 2.

B) For 16QAM and 64QAM (without Rank Filter):
When the "current reported RI">"previous reported RI" and overall (OLRC) BLER is >10% (TAR- GET_BLER+offset), reduce OLRC filtered MCS by one index (if it is not in the lowest index) for both code words.
  B1) This case applies for the single code word case, when the Rank is increased by one (1 to 2; 2 to 3; or 3 to 4) in case of one-rank switch, or two (1 to 3; 1 to 4; or 2 to 4) in case of two-ranks switch.
  B2) This case applies for the two code words case:
    B2a) In case of one-rank switch: i) CW1 only, increase Rank from 2 to 3, and ii) CW0 only, increase Rank from 3 to 4;
    B2b) In case of two rank switch: for both CW, increase Rank by two (1 to 3; 1 to 4; or 2 to 4).
C) *Offset:
Offset can be, e.g., 10% or 20% of the target BLER. As an example, offset=11%=(10%+1%=10% of TARGET_BLER).
D) A flag RANK_SWITCHED=TRUE is set upon switching the rank from a lower rank to a higher rank, and the MCS adjusted value, MCS_ADJUSTED=M (one for each code word in case of two code words) is stored. The "M" is number of MCS indexes reduced for a particular code word.

"Minimal Proactive MCS Adjustment" is provided as a protection mechanism to ensure the BLER does not increase beyond the target BLER, i.e., the MCS is adjusted only when the BLER is higher than 10%. According to the example embodiment of the present disclosure, only one MCS Index is adjusted because it is desired to allow all UEs to operate on their own Rank with minimal control, thereby enabling detection of nonconforming UEs. Because the monitoring period for detecting the nonconforming UEs is significant (e.g., several TTIs), a protection mechanism is needed to keep the target BLER under control for the nonconforming UEs.

In the above-described "Minimal Proactive MCS Adjustment" technique, when switching from one code word (CW) to two CWs during rank switching, if there is a previous HARQ process for the same UE with single CW and it is scheduled for retransmission, then the retransmission should be scheduled with two CW with new MCSs. In addition, there is an exception to the above-described "Minimal Proactive MCS Adjustment" technique: in case the Rank is switched from a higher rank to a lower rank, no MCS adjustment is performed.

This section describes an example technique to determine whether a UE is conforming or nonconforming. As part of the technique, one flag and one counter are provided:
A) New Counter: Per Rank based BLER, RankBler [MAX_RANK] for max rank 4.
  RankBler will include the residual errors, because there are scenarios in which rank will change for retransmissions. MAX_RANK=2 or 4 depends on UE receive antennas and capability.
B) New Flag: for each UE, enum={NOT_DETECTED, NONCONFORMING_UE, CONFORMING_UE}
  B1) NOT_DETECTED: for at-least "RI_PERIODICITY*N" (for example, RI_PERIODICITY=40, N=50, 40*50=2000TTIs) PDSCH BLER RankBler[4] will not be up to date, and during this time the UE is flagged with this value. The value "N" is configurable as desired.
  B2) To Handle Bad Channel: Monitor the Rank1 transmissions in "RI_PERIODICITY*N" period. After the duration of the period, if RankBler[0] the "Rank1 counter BLER">"(TARGET_BLER*Offset)" (for example, offset can be 2), then conclude the BLER is due to bad channel condition. In this case, set the flag as "NOT_DETECTED", and restart the "RI_PERIODICITY*N" timer again. If the flag is set as "NOT_DETECTED", this is the final step in the technique, i.e., no NONCONFORMING_UE and CONFORMING_UE conditions check will be done as described below.
  B3) NONCONFORMING_UE: After "RI_PERIODICITY*50" (based on above example, 40*50=2000TTIs) PDSCH BLER, we will have at-least some rank 2/3/4 BLER, if the "Rank 2 or 3 or 4 BLER">"(TARGET_BLER*Offset)" (for example offset can be 2), then the UE will be flagged with this value (NONCONFORMING_UE). This BLER check will be done after 2000TTIs, to update the flag.
    B3a) It should be noted that within the period "RI_PERIODICITY*N", not every RI_PERIODICITY is monitored; instead, only the periodicity in which the Rank switch from a lower rank to a higher rank is occurring is monitored. Otherwise, if every RI_PERIODICITY is monitored, the OLRC may control the BLER within the TARGET_BLER during the "RI_PERIODICITY*N" time.
    B3b) For example, RankBler[1]=Rank=2 BLER, after the Rank is switched from 1 to 2

(for only one RI_PERIODICITY) =

$$\frac{\text{Number of unsuccessful } PDSCH \text{ transmission with Rank 2 for one } RI \text{ periodicty}}{\text{Number of unsuccessful and successful } PDSCH \text{ transmission with Rank 2 for one } RI \text{ periodicty}}$$

This will continue for all periodicity in which the rank is switched from lower to higher Rank, for example Rank 1 to 2. The BLER will be accumulation of all these occasions in which Rank is switched from 1 to 2.
  B4) CONFORMING_UE: If i) the BLER check fails (after 2000TTIs) in the above-described step, and ii) the "Rank 2 or 3 or 4 BLER"<"TARGET_BLER", then the UE will be flagged with this value (CONFORMING_UE).
    B4a) Timer Expiry: If the timer for "RI_PERIODICITY*N" time period has expired and there is no RankBler counter available in the "Rank 2 or 3 or 4 BLER", then restart the timer again.
    B4b) Once the UE is flagged as NONCONFORMING_UE, nonconforming UE-specific rank filtering and MCS adjustment (hereinafter referred to as "Full-fledged Proactive MCS Adjustment") is applied, instead of using "Common Rank filtering".

The above-described mechanism/technique to detect the BLER during rank switch takes into consideration mobility and different channel conditions, i.e., the above-described mechanism/technique monitors the transmit diversity (TD) transmissions (the MIMO Rank will be one) along with rank switch transmission. In this manner, whenever a decision is to be made using rank switch BLER, TD transmission BLER is also checked. If the TD transmission BLER is also poor, it is concluded that the data is not reliable, and the monitoring period is extended to decide at later point in time.

In MAC layer gNB/eNB using only CRNTI as the ID for a UE, this is valid for only RRC connected UEs, and the gNB/eNB will not save the classification decision (e.g., conforming or nonconforming) across different UE states, which is not useful. The gNB/eNB stores the decision along with MAC UE context where CRNTI is stored, and the classification decision (e.g., conforming or nonconforming) is deleted when the UE context is deleted in MAC layer. Therefore, the classification is done for only RRC connected UEs.

The classification decision is a one-time event for each UE, i.e., once the classification is done, the single classification (e.g., conforming or nonconforming) is used for the UE lifetime in the cell. Although the chances of incorrectly classifying a conforming UE as a nonconforming UE is very low when using the techniques described herein, in case of incorrect classification of a conforming UE as a nonconforming UE, the rank switches still work effectively even though "full-fledged proactive MCS adjustment" technique is applied for nonconforming UEs. For the hypothetical misclassification, i.e., conforming UE as a nonconforming UE, the "full-fledged proactive MCS adjustment" technique would still work in SINR domain, and since the conforming UE (although misclassified as nonconforming) will report correlated CQI and rank, if the CQI is converted to SINR and the "full-fledged proactive MCS adjustment" technique applied, the impact of "full-fledged proactive MCS adjustment" will be minimized.

The section describes an example embodiment of a technique for rank filtering of nonconforming UEs. The first example embodiment described here is for TTI in which the RI is received ("RI-received occasion") for QPSK in low SINR condition. As a first step, it is determined whether the following condition is met:
  Condition #1: If OLRC applied iMcs is QPSK, then
    (CW0 iMcs+CW1 iMcs)/2<=QPSK Range (for LTE: iMcs 0 to 9 for 64QAM MCS table, or iMcs 0 to 4 for 256QAM MCS table)
This condition refers to OLRC applied iMcs/iTbs which is available in the beginning of the scheduling/Rank Filtering. Satisfaction of this condition will be determined before the "Full-fledged Proactive MCS Adjustment" step. This condition can be done in SINR or iMCS or iTbs domain.

As a second step, it is determined whether the following condition is met:
  Condition #2: if Condition #1 is satisfied and received Rank>=2, then
    Rank 1 is allowed without (filtering) restriction.
  Next, the following can be performed:
  A) Perform BR filtering for the Rank received from the UE to produced FILTERED_RI. For example, co-efficient for the IIR filter can be 0.2, and Rank filter is initialized to 1.
  B) Calculate Rounded filtered RI: ROUNDED_FILTERED_RI=floor(FILTERED_RI+ 0.5)
  C) If ROUNDED_FILTERED_RI>=3 (for 4RX UE with MAX_RANK=4) or RI>=2 (for 2RX UE with MAX_RANK=2), reset the RI to 1 (rank threshold is 2), i.e.,

ROUNDED_FILTERED_RI=1 so in QPSK Ranks 3 and 4 are never allowed.
  D) FINAL_RI=Min(ROUNDED_FILTERED_RI, UE reported RI), to avoid choosing the higher rank than UE reported RI.

The second example embodiment of a technique for rank filtering of nonconforming UEs described here is for TTI in which the RI is received ("RI-received occasion") for 16QAM/64QAM in high SINR. As a first step, it is determined whether the following condition is met:
  Condition #1: If OLRC applied iMcs is 16QAM/64QAM, then
    (CW0 iMcs+CW1 iMcs)/2<=16QAM/64QAM Range (for LTE: iMcs 10 to 28 for 64QAM MCS table (or) iMcs 5 to 27 for 256QAM MCS table).
This condition refers to OLRC applied iMcs/iTbs which is available in the beginning of the scheduling/Rank Filtering. Satisfaction of this condition will be determined before the "Full-fledged Proactive MCS Adjustment" step. This condition can be done in SINR or iMCS or iTbs domain.

As a second step, it is determined whether the following condition is met:
  Condition #2: if Condition #1 is satisfied and received Rank>=2, then
    Rank 1 is allowed without (filtering) restriction.
  Next, the following can be performed:
  A) Perform IIR filter for the Rank received from the UE. For example, co-efficient for the IIR filter can be 0.2, and Rank filter is initialized to 2.
  B) Round filtered RI: ROUNDED_FILTERED_RI=floor (FILTERED_RI+0.5)
  C) FINAL_RI=Min(ROUNDED_FILTERED_RI, UE reported RI), to avoid choosing the higher rank than UE reported RI.

For TTI in which the RI is not received ("non-RI occasion"), the FINAL_RI calculated in the RI-received occasion is reused, and no new calculation is performed.

"Full-fledged Proactive MCS Adjustment" for nonconforming UEs in RI-received occasions is described herein. For QPSK, 16QAM and 64QAM, when the current FINAL_RI is different from the previous FINAL_RI, a flag RANK_SWITCHED=TRUE is set upon switching the rank, and the MCS adjusted value, MCS_ADJUSTED=M (one for each code word in case of two code words) is stored. The "M" is number of MCS indexes reduced for a particular code word, during the last step when adjusting the OLRC Offset. Next, "Full-fledged Proactive MCS Adjustment" technique will be used with SINR, code rate and modulation order tables. "Full-fledged Proactive MCS Adjustment" is applicable for all RI-received occasions if the rank is switched, irrespective of whether the DL data transmission is scheduled or not.

A goal of "Full-fledged Proactive MCS Adjustment" is to make the throughput stable during a rank switch, and OLRC adjustment is used to achieve this goal. According to an example embodiment of the present disclosure, in a particular SINR condition, i) the operation starts with nominal MCS initially and ensures the success of the higher rank within the target BLER, and ii) the OLRC will increase the MCS and reach the optimal MCS possible for the SINR. In this manner, the higher data rate possible with higher rank can be achieved step by step, in a phased manner.

Full-fledged Proactive MCS Adjustment technique utilizes three static tables, i.e., PdschMcs2SinrMapping, Sinr2PdschCodeRateMapping, and Sinr2PdschModOrderMapping. In the example embodiment described herein, only the sample 256QAM MCS-table based values are given, but each of the three static tables is different for 64QAM and 256QAM MCS tables.
  A) PschMcs2SinrMapping[28]={−0.75, 0.5, 1.75, 3, 4.25, 5.6, 6.95, 8.3, 9.65, 11, 12.35, 13.56, 14.76, 15.97, 17.18, 18.38, 19.59, 20.79, 22, 23.21, 24.46, 25.72, 26.98, 28.23, 29.49, 30.74, 32}

B) Sinr2PdschCodeRateMapping[28]={0.12, 0.19, 0.3, 0.44, 0.59, 0.37, 0.42, 0.48, 0.54, 0.6, 0.64, 0.46, 0.5, 0.55, 0.6, 0.65, 0.7, 0.75, 0.8, 0.85, 0.67, 0.69, 0.74, 0.78, 0.82, 0.86, 0.9, 0.93}

C) Sinr2PdschModOrderMapping[28]={2, 2, 2, 2, 2, 4, 4, 4, 4, 4, 4, 6, 6, 6, 6, 6, 6, 6, 6, 8, 8, 8, 8, 8, 8, 8, 8}

Figure 2:
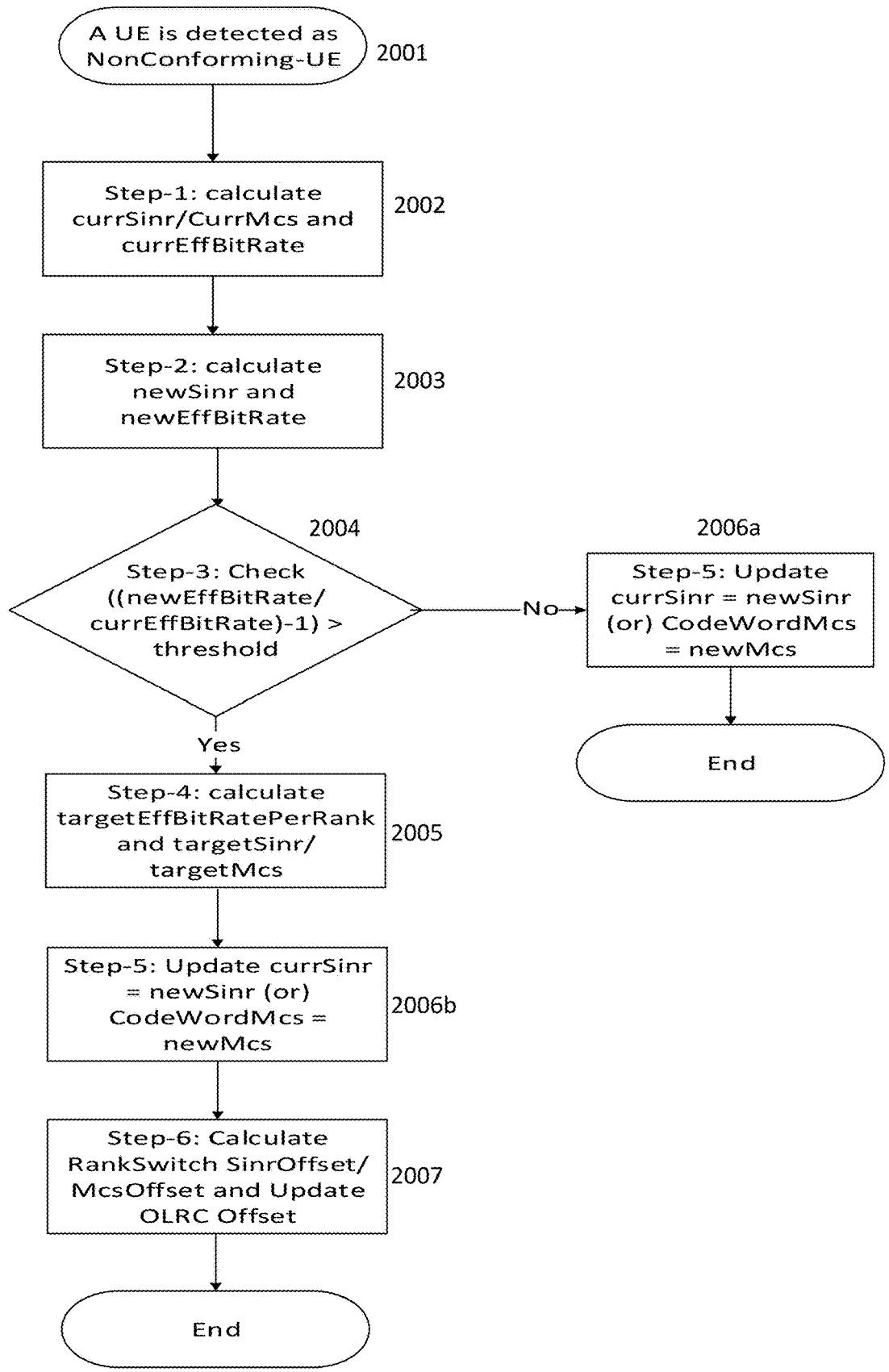
FIG. 2 illustrates a flowchart of the Full-fledged Proactive MCS Adjustment technique for a nonconforming UE.

FIG. 2 illustrates a flowchart of the Full-fledged Proactive MCS Adjustment technique for a nonconforming UE, a goal of which technique is to gracefully switch the rank, and to ensure the higher rank transmission is successful at the same SINR with reliable MCS than the MCS used for lower rank. This is key for higher rank transmissions, because we don't have SINR-based rank switching, and a compensation mechanism is needed. Once a UE is detected as a nonconforming UE (as shown at block 2001), then the technique calculates (at block 2002, illustrating Step 1), based on the current efficient rank ("currEffRank"), the following variables: current SINR ("currSinr"), current target code rate ("currTargetCodeRate") and current modulation order ("currModOrder"). "CurrEffRank" is the current MIMO rank of the PDSCH channel, i.e., the output of rank filtering of a nonconforming UE, as described above. "CurrSinr" can be calculated by converting the current Code word MCS (which indicates the MCS being maintained based on filtering of the instantaneous CQI reports without OLRC offset correction) to SINR using the PdschMcs2SinrMapping table. "Code Rate" refers to the code rate (or information rate) of a forward error correction code, i.e., the proportion of the data-stream that is useful (non-redundant). In other words, if the code rate is k/n for every k bits of useful information, the coder generates a total of n bits of data, of which n-k are redundant. Target Code Rate refers to the target code rate of PDSCH channel that is sought to be achieved. "CurrTargetCodeRate" refers to the current target code rate of PDSCH channel that is sought to be achieved, which can be determined based on the above-described static tables by keying in current SINR or current MCS. "Modulation Order" of a digital communication scheme is determined by the number of the different bits that can be transmitted using the communication scheme. For example, QPSK is a modulation scheme in which 2 different bits can be transmitted, so the modulation order is two. Current modulation order ("currModOrder") is the current modulation order of PDSCH channel that is sought to be achieved, and currModOrder can be determined based on the above-described static tables by keying in current SINR or current MCS.

In addition, as part of the Step 1 shown at block 2002, current efficient bit rate ("currEffBitrate") is calculated as follows:

currEffBitRate=currTargetCodeRate*currEffRank*currModOrder

In other words, current efficient bit rate of PDSCH channel can be calculated by multiplying the current target code rate by current MIMO rank and current modulation order, which can be determined based on the above-described static tables by keying in current MCS or current SINR.

Next, as shown at block 2003, as part of Step 2, the technique calculates, based on the new efficient rank ("newEffRank"), the following variables: new SINR ("newSinr"), new target code rate ("newTargetCodeRate"), and new modulation order ("newModOrder"). "NewEffRank" is the new MIMO rank of the PDSCH channel, i.e., the output of rank filtering of nonconforming UE, as described above. "NewSinr" is calculated differently for different scenarios, and several example scenarios are described for handling spatial multiplexing of maximum 4 layers, but the present technique can be readily extended for 8 layers or more. "NewTargetCodeRate" is the new target code rate of PDSCH channel that is sought to be achieved, which can be determined based on the above-described static tables by keying in new SINR or new MCS. "NewModOrder" is the new modulation order of PDSCH channel that is sought to be achieved, which can be determined based on the above-described static tables by keying in current SINR or current MCS.

Scenario #1: When Rank is switched from 1 to 2, there is only one MCS/Sinr for one code word, in which case newSinr=currSinr−10 log 10(newEffRank);newEf-
fRank=2;oldEffRank=1

In case two layers are mapped to two code words, CW1 newSinr=CW0 newSinr, and MCS calculated for CW0 is also assigned to CW1.

Scenario #1a: When Rank is switched from 1 to 2, there is only one MCS/Sinr for one code word, and the network environment is 5G NR, in which case newSinr=currSinr−10 log 10(newEffRank);newEf-
fRank=2;oldEffRank=1

In case two layers are mapped to one code word, there is only one MCS/Sinr, and all remaining steps of the Full-fledged Proactive MCS Adjustment technique (i.e., steps 3, 4, 5 and 6) are valid.

Scenario #2: When Rank is switched from 2 to 3, there are two MCS/Sinr for two code words, newSinr will be calculated for only CW1, because in case 3 layers are provided, 1 layer will be mapped to CW0 and another 2 layers will be mapped to CW1. In this scenario, newSinr=currSinr−10 log 10(newEffRank);newEf-
fRank=2;oldEffRank=1;

newSinr is for only CW1, and there is no change in CW0 sinr/MCS.

Scenario #2a: When Rank is switched from 2 to 3, there is only one MCS/Sinr for one code word, and the network environment is 5G NR, in which case newSinr=(currSinr+10 log 10(OldEffRank=2))−10
log 10(newEffRank);newEffRank=3;

(or alternatively expressed as)

newSinr=currSinr−10 log 10(newEffRank/OldEf-
fRank=2);newEffRank=3

In case if three layers are mapped to one code word, there is only one MCS/Sinr, and all steps are valid.

Scenario #3: When Rank is switched from 3 to 4, there are two MCS/Sinr for two code words, and newSinr will be calculated for only CW0, because in case of 3 to 4 layers transmission switch, 2 layers will be mapped to CW0 only; where CW0 was mapped to a single layer in case of rank 3 transmission. In this scenario, newSinr=currSinr−10 log 10(newEffRank);newEf-
fRank=2;oldEffRank=1;

newSinr is for CW0, and there is no change in CW1 sinr/MCS.

Scenario #3a: When Rank is switched from 3 to 4, there is only one MCS/Sinr for one code word, and the network environment is 5G NR, in which case newSinr=(currSinr+10 log 10(oldEffRank=3))−10 log
10(newEffRank);newEffRank=4;

In case four layers are mapped to one code word, there is only one MCS/Sinr, and all remaining steps of the Full-fledged Proactive MCS Adjustment technique (i.e., steps 3, 4, 5 and 6) are valid.

Scenario #4: When Rank is switched from 4 to 3, there are two MCS/Sinr for two code words, and in this case of 4 to 3 layers transmission switch, CW0 with 2 layers will be remapped to 1 layer, and CW1 will remain the same. In this scenario, newSinr=currSinr+10 log 10(oldEffRank=2);newEffRank=1;

newSinr is for CW0, no change in CW1 sinr/MCS.

Scenario #4a: When Rank is switched from 4 to 3, there is only one MCS/Sinr for one code word, and the network environment is 5G NR, in which case newSinr=(currSinr+10 log 10(OldEffRank=4))−10 log 10(newEffRank);newEffRank=3;

In case three layers are mapped to one code word, there is only one MCS/Sinr, and all remaining steps of the Full-fledged Proactive MCS Adjustment technique (i.e., steps 3, 4, 5 and 6) are valid.

Scenario #5: When Rank is switched from 3 to 2, there are two MCS/Sinr for two code words, and in this case of 3 to 2 layers transmission switch, CW1 with 2 layers will be remapped to 1 layer, and CW0 remains the same. In this scenario, newSinr=currSinr+10 log 10(oldEffRank=2);newEffRank=1;

newSinr is for CW1, no change in CW0 MCS/Sinr.

Scenario #5a: When Rank is switched from 3 to 2, there is only one MCS/Sinr for one code word, and the network environment is 5G NR, in which case newSinr=(currSinr+10 log 10(oldEffRank=3))−10 log 10(newEffRank);newEffRank=2

In case if two layers are mapped to one code word, there is only one MCS/Sinr, and all remaining steps of the Full-fledged Proactive MCS Adjustment technique (i.e., steps 3, 4, 5 and 6) are valid.

Scenario #6: When Rank is switched from i) 2 to 1, or ii) 3 to 1, or iii) 4 to 1, there are two MCS/Sinr for two code words. In this scenario, MaxCW-Sinr=MAX(CW0-Sinr,CW1-Sinr);
CurrSinr=MaxCW-Sinr;

newSinr=currSinr+10 log 10(oldEffRank=2 or 3 or 4);newEffRank=1;

newSinr is for single CW.

Scenario #6a: When Rank is switched from i) 2 to 1, or ii) 3 to 1, or iii) 4 to 1, there is only one MCS/Sinr for one code word, and the network environment is 5G NR, in which case newSinr=currSinr+10 log 10(oldEffRank=2 or 3 or 4);newEffRank=1;

newSinr is for single CW.

Common for all scenarios is the following: When switching from one CW to two CW during rank switching, if there are previous HARQ process for the same UE with single CW and it is scheduled for retransmission, then the retransmission is scheduled with two CW with new MCSs In addition, as part of the Step 2 shown at block 2003, new efficient bit rate ("newEffBitrate") is calculated as follows:

newEffBitRate=newTargetCodeRate*newEffRank*newModOrder

In other words, new efficient bit rate of PDSCH channel can be calculated by multiplying the new target code rate by the new MIMO RI rank and the new modulation order, which can be determined based on the above-described static tables by keying in new MCS or new SINR.

Next, as shown at block 2004, it is determined whether the following condition is met:

$$\frac{newEffBitRate}{currEffBitRate} - 1 > threshold$$

The "threshold" value can be appropriately optimized based on test results, e.g., example threshold value can be 20% or 0.2. If the above condition is met, the technique proceeds to Step 4 shown at block 2005. On the other hand, if i) output is negative (for scenarios #4, #4a, #5, #5a, #6 and #6a, the output will always be negative), or ii) the above condition failed (and the output is positive), the technique proceeds directly to Step 5 (shown as a "No" path to block 2006*a*), after which step the technique is ended.

As shown at block 2005, Step 4 involves, among others, calculating target SINR ("targetSinr") with new rank, to achieve a smooth efficient bit rate change (FIG. 2, block 2005 shows calculating target efficient bit rate per rank ("targetEffbitRatePerRank") and targetSinr and/or targetMCS). If the condition (oldEffRank>1)||(newEffRank==1&& oldEffRank==2)

is true, then the following holds true:

A) For Scenarios #1, #1a, #2, #2a, #3 and #3a, targetEffBitRatePerRank=((currEffBitRate+(5% of currEffBitRate))+(currEffBitRate/oldEffRank))/newEffRank B) For Scenarios #4, #4a, #5 and #5a, targetEffBitRatePerRank=((currEffBitRate+(5% of currEffBitRate))−(currEffBitRate/oldEffRank))/newEffRank C) For Scenarios #6 and #6a, targetEffBitRatePerRank=((currEffBitRate+(5% of currEffBitRate))−(currEffBitRate/oldEffRank)*(oldEffRank−1))/newEffRank;

For scenario #6, the two code words currEffBitRate need to be consolidated into single currEffBitRate.

If the condition (oldEffRank>1)||(newEffRank==1&& oldEffRank==2)

is not true, then the following holds true:

targetEffBitRatePerRank=(currEffBitRate+(5% of currEffBitRate))/newEffRank

In the above equations, the following should be noted:
A) newEffRank and oldEffRank are the ranks used in the newSinr calculation.
B) 5% is added to the currEffBitRate, to handle the actual values of sinr/codeRate to table values mapping. Worst case scenario is, e.g., due to mapping to lower sinr/codeRate, it is possible to end up with lower targetEffBitRatePerRank. The 5% value is an example, and can be optimized based on field results.

As part of Step 4, Sinr2PdschCodeRateMapping and Sinr2PdschModOrderMapping are used find the smallest SINR as targetSinr to satisfy the following condition:

codeRate*modOrder>=targetEffBitRatePerRank

Next, as part of Step 5 (either block 2006a in the "NO" path from block 2004, or block 2006b in the "YES" path from block 2004), currSinr is updated to newSinr, i.e., currSinr=newSinr, and its corresponding MCS ("newMcs") becomes Code word MCS, i.e., Code word MCS=newMcs. Code word MCS indicates the MCS which is sought to be maintained based on filtering the instantaneous CQI reports. Once the Code word MCS is updated, it is used to do filtering with new CQI received in the report. For example, updated Single CWCqiBasediTbs is used to do IIR filtering with new CQI, which is Single CWCqiBasediTbs*(80%)+ newCQIBasediTbs*(20%).

As shown at block 2007 in FIG. 2, Step 6 involves i) calculating rank switch MCS Offset ("McsOffset") or SINR Offset ("SinrOffset"), and ii) updating OLRC Offset ("CW0lrcOffset").

A) In MCS domain:

McsOffset=(CONV2*MCS*(newSinr)−CONV2*MCS* (targetSinr)).

"CONV2MCS" is a utility function to convert SINR to MCS, e.g., this can be implemented by inputting the SINR value in the "SINR to MCS" 256QAM MCS mapping table given in the above section and find the corresponding MCS value. Next, the OLRC MCS is corrected with the new offset:

updated CW0lrcOffset=(previous CW0lrcOffset− (McsOffset*(olrcStepUp+olrcStepDn))

"OlrcStepUp" and "olrcStepDn" are logical names, and the physical name will be as per the product code. CW0lrcOffset is accumulated over multiple TTIs, so this value is carried over to next rank switch calculation. However, it should be noted that for scenarios #1, #1a, #2, #3, #4, #4a, #5, #5a, #6 and #6a, the previous McsOffset in CW0lrcOffset is not considered, so this value is not carried over to next rank switch calculation. Next, Code word MCS is updated:

updated Code word MCS=(previous Code word MCS)+ (CW0lrcOffset)

B) In SINR domain:

SinrOffset=(newSinr−targetSinr).

Next, the OLRC Sinr is corrected with the new offset, in the following manner:

updated CW0lrcOffset=(previous CW0lrcOffset− SinrOffset)

CW0lrcOffset is accumulated over multiple TTIs, so this value is carried over to next rank switch calculation. However, it should be noted that for scenarios #1, #1a, #2, #3, #4, #4a, #5, #5a, #6 and #6a, the previous SinrOffset in CW0lrcOffset is not considered, so this value is not carried over to next rank switch calculation. Next, Code word Sinr is updated:

updated Code word Sinr=(previous Code word Sinr)+(CW0lrcOffset)

This section describes some additional details of the Full-fledged Proactive MCS Adjustment technique for a nonconforming UE as described above and illustrated in FIG. 2. First, Step 5 and Step 6 can be performed in SINR, iMCS or iTbs domain. Second, additional specific example characteristics for several specific Scenarios described above are presented below:

A) For example, in Scenario #1, if the rank is switched from rank 1 to 2, two code words are now required as opposed to one code word, but only one OLRC Offset exists for one code word. In this case, the OLRC Offset is split into equal halves:

CW0 OLRC offset=Single CW0lrcOffset/2;

CW1 OLRC offset=Single CW0lrcOffset/2

B) For example, in Scenario #1a, if the rank is switched from rank 1 to 2, only one code word is required. In this case, the OLRC Offset is cut to half for SCW:

new single CW OLRC offset=previous single CW0lrcOffset/2

C) For example, in Scenario #2, if the rank is switched from rank 2 to 3, two code words are required. In this case, the OLRC Offset for CW1 is cut to half:

CW0 OLRC offset=CW0OlrcOffset;

new CW1 OLRC offset=previous CW101rcOffset/2

D) For example, in Scenario #2a, when the rank is switched from rank 2 to 3, there is only one MCS or SINR for one code word, and transport block (TB) size is small. In this case, the OLRC Offset is cut to half:

new single CW OLRC offset=previous single CW0lrcOffset/2

E) Rank switch in Scenario #3 and Scenario #3a will be handled similarly as explained above.

F) For example, in Scenario #6, when the rank is switched from 2 to 1, or 3 to 1, or 4 to 1, there are two MCS (or Sinr) for two code words, but we need to transition to a single code word. For this case:

MaxCW-OLRC offset=MAX(CW0-OLRC offset, CW1-OLRC offset); and

MinCW-OLRC offset=MIN(CW0-OLRC offset, CW1-OLRC offset).

To transition to a single code word, the gain of two independent paths in the channel are converged. When fully transitioned to a single code word, the channel gain is from one path. In this case, it is desirable to have one-half of the channel gain from each of the two independent paths that were converged. If i) both CW offsets are positive, or ii) both CW offsets are negative, or iii) one CW offset is positive and one CW offset is negative, then:

Single CW OLRC offset=(MaxCW-OLRC offset/2)+ (MinCW-OLRC offset/2)

G) For scenarios #4, #4a, #5, #5a and #6a, the deltaiTbs is used as it is without any modification, and in these cases, MCS is increased.

Described in this section is a detailed example case of Full-fledged Proactive MCS Adjustment technique for a nonconforming UE. In this example, a rank switch module switches the rank from 1 to 2, and 256QAM MCS table (discussed above) is used.

1) Step-1: MCS index=13 (Code word MCS), currSinr=15.97 dB, CR=0.55, MO=6, Rank=1, currEffBitRate=3.3 bits
2) Step-2: Sinr=12.97 dB (currSinr−10 log 10(rank=2)), MCS index=10, newSinr=12.35 dB (SINR from table), CR=0.64, MO=4, Rank=2, newEffBitRate=5.12 bits
3) Step-3: (5.12/3.3)−1=0.55 or 55%>20%
4) Step-4: TargetEffBitRate=(3.3+0.165 (5%))/2=1.73 bits
5) Step-4: TargetEffBitRate=1.73 (from table), CR=0.42, MO=4, MCS index=6, targetSinr=6.95 dB 6) Step-5: Replace the currSinr=newSinr
   In MCS domain, currMCS=newMCS
   currMCS=10 (newMCS);
7) Step-6:
   a) RankSwitchOffset=newSinr−targetSinr=12.35 dB—6.95 dB=5.4 dB
      In MCS Domain, RankSwitchOffset=newMcs−targetMcs=10−6=4 (MCS Index)
   b) OLRCOffset=OLRCOffset−RankSwitchOffset=0−5.4 dB=−5.4 dB (there is no previous OLRC offset accumulation)
      OLRCOffsetMcs=OLRCOffsetMcs−RankSwitchOffset=0−4=−4 (MCS Index)
   c) newSinr+OLRCOffset=12.35 dB+(−5.4 dB)=6.95 dB
      newMcs+OLRCMcs=10+(−4)=6 (MCS Index)
8) Final code rate CR=0.42, modulation order MO=4, MCS index=6, SINR=6.95 dB In this example case, the following are achieved: i) MCS is reduced from 13 to 6; ii) achieved code-rate=(0.42*4)*(rank=2)=3.36 bits; and iii) EffBitRate is changed from 3.3 bits to 3.36 bits.

In this section, Outer Loop Rate Control (OLRC) optimization is discussed, which optimization is applied to both conforming and nonconforming UEs. It should be noted that when rank (RI) filtering is performed, the rank filtering is not responding to BLER, in contrast to OLRC in which CQI is filtered and OLRC responds to BLER using step-up and step-down. When the rank is switched from a lower rank to a higher rank, we will end up decreasing the MCS because of BLER, but the reason for the BLER may be due to the higher filtered RI. In field testing, the UEs reported rank of 4 when CQI<10. For example, if a nonconforming UE is continuously sending reported rank of 4 and increases the rank filter value to 4, the OLRC optimization technique as described herein will bring down the rank and keep the BLER under control. In the case of conforming UEs, the OLRC optimization technique as described herein serves as a protection mechanism to avoid the BLER. Even if a conforming UE's rank is correctly identified, there is a possibility of incorrect rank estimation due to, e.g., interference, and the OLRC optimization technique can compensate for such incorrect rank estimation. The OLRC Optimization involves the following:

A) Condition #1: if the RI is received (RI occasion) from the UE and FINAL_RI>1 (RI from rank filtering module, the UE can be either conforming or Nonconforming UE), and
B) Condition #2: RANK_SWITCHED flag is TRUE, and if the NACK for the first or continuous "O" (O>=1) PDSCH after RI occasion is received ("O" value is appropriately configurable, e.g., for conforming UEs the "O" value can be set to large value of 2 or 3),
   B1) then reduce the FILTERED_RI by 1 (FILTERED_RI−1), reduce the OLRC stepdown (revert the OLRC stepdown), and MCS reduction is not necessary, as rank is reduced; and
   B2) adjust the OLRC step-up, and increase the MCS by M index, where is M is taken from MCS_ADJUSTED, to compensate for the adjustment made during rank filtering.
C) If NACK is received again for the next new transmission, then reduce MCS as per OLRC and continue as usual, there is no OLRC optimization.

The above logic will be repeated again when a new RI is received in an RI occasion, but until that point OLRC and RI filtering will continue as usual without the OLRC Optimization.

An example of the above-described OLRC optimization as explained in the context of TTI progression is described in this section (N and M being positive integers).
1) TTI #N: RI Occasion #N;
2) TTI #N+4: NACK, FILTERED_RI−1, revert the OLRC stepdown;
3) TTI #N+5: NACK, OLRC/RI filtering continues as usual;
4) TTI #N+M: RI Occasion #N+M;
5) TTI #N+M+4: NACK, FILTERED_RI−1, revert the OLRC stepdown;
6) TTI #N+M+5: NACK, OLRC/RI filtering continues as usual.

The example embodiment of the OLRC optimization according to the present disclosure is only for the case of NACK reception. In the case of ACKs being received, OLRC will increase only MCS, but the rank remains the same. In addition, the example embodiment of the OLRC optimization according to the present disclosure is done once per RI-received occasion.

This section describes an example technique of Precoding Matrix Indicator (PMI) adaptation based on filtered RI. In the example embodiment of the method according to the present disclosure, there are at least two scenarios to handle when a RI is reported from a UE:
1) a UE reported a high RI/PMI, but the eNodeB adapted to lower RI/PMI based on RI filtering; and
2) a UE reported a low RI/PMI, but the eNodeB adapted to higher RI/PMI based on RI filtering.

To handle the first scenario, the 4Tx TM4 codebook provided in the 3GPP physical layer specification is utilized. The 3GPP physical layer specification defines a table with one column for codebook index (PMI reported by the UE), and another column for the precoding weight for each layer (e.g., 1, 2, 3 or 4), which can be chosen using RI reported by the UE or the rank computed by the rank filtering module. For example, if the reported PMI=2, and the reported RI=3, but the filtered RI output is "2", then it must be decided which entry corresponding to the PMI index to use, and we have to fall back to the weight of two Layers instead of using the weight of three Layers. To handle the second scenario, a below-described minimum function with two inputs is used in the rank filtering technique previously described above, i.e., one input is IIR filtered RI output and the second input is the current reported RI by UE, and whichever is minimum will be used as the RI (FINAL_RI) for the current PSDCH:

$$FINAL\_RI = \text{Min}(\text{floor}(FILTERED\_RI+0.5), UE \text{ reported RI})$$

The techniques described in the present disclosure are applicable to LTE and 5G NR, among others, but there are two main differences in implementation for 5G NR in comparison to LTE, namely the codebook and code word-to-layer mapping.
A) Codebook:
   The 5G NR codebook is different from the 4-antenna port codebook defined in LTE, which means the PMI adaption during the rank filtering is different, and the PMI feedback is different. In the 5G NR, the PMI feedback consists of more than one component, but adapting the PMI from one rank to another rank is substantially similar to the adaptation in LTE. For 5G NR, a different codebook applies for a different rank. In accordance with the present disclosure, the 5G NR PMI components such as i1_1, i1_2 and i_2 for a rank will be reused for another rank. The PMI components reported for a rank codebook can be reused for another rank codebook, with slight or no modification, but the DL transmission will be successful and efficient, nevertheless.

B) Code Word-to-Layer Mapping:

In LTE, one code word can be mapped to 1, 2, 3 or 4 ranks, and at the same time two code words can be mapped to 2, 3, 4 or above ranks. In contrast, in 5G NR, one code word can be mapped to 1, 2, 3 or 4 ranks, and at the same time two code words can be mapped to 5, 6, 7, 8 or above ranks. Given this difference in the code word-to-layer mapping between the 5G NR and LTE, some modifications are required for 5G NR in Step-2 of Full-fledged Proactive MCS adjustment technique, as previously explained above in specific scenarios limited to 5G NR.

The example embodiments according to the present disclosure can be implemented primarily in software (e.g., stored on computer-readable medium) or, in the alternative, in hardware using, for example, hardware components such as application specific integrated circuits (ASICs). The various techniques (e.g., rank filtering, Full-fledged Proactive MCS Adjustment, and OLRC optimization) described in connection with the example embodiments can be performed on the base station side (e.g., at eNB or gNB), and/or in a distributed fashion (i.e., not necessarily limited to the hardware/software locally associated with the eNB or gNB). Implementation of the hardware state machine so as to perform the functions described herein will be apparent to persons skilled in the relevant art(s). Alternatively, the example embodiments according to the present disclosure can be implemented using a combination of both hardware and software.

While various example embodiments of the present disclosure have been described above, the example embodiments are merely exemplary and should not be interpreted as limiting. It will be apparent to persons skilled in the relevant art(s) that various changes in form and detail can be made therein, and these variations are fully encompassed by the present disclosure.

In this document, the term "computer-readable medium" generally refers to media such as removable storage drive, a hard disk installed in hard disk drive, volatile memory or non-volatile memory, removable or non-removable memory, erasable or non-erasable memory, writeable or re-writeable memory, and the like, which media serve as storage for computer programs that can be provided to, and executed by, computer systems. Computer programs can also be received via a communications interface. Computer programs, when executed, enable the computer system to perform the features of the present invention, as discussed herein. In particular, the computer programs, when executed, enable a processor to perform the features of the example embodiments of the present disclosure. Some examples of computer-executable instructions can include suitable type of code, e.g., source code, compiled code, interpreted code, executable code, static code, dynamic code, object-oriented code, visual code, and the like. The examples are not limited in this context.

The techniques and embodiments described herein are exemplary, and should not be construed as implying any specific limitation on the present disclosure. It should be understood that various alternatives, combinations and modifications could be devised by those skilled in the art. For example, steps associated with the processes described herein can be performed in any order, unless otherwise specified or dictated by the steps themselves. The above description is illustrative, and is not intended to be restrictive. One of ordinary skill in the art may make numerous modifications and/or changes without departing from the general scope of the disclosure. For example, and as has been described, the above-described embodiments (and/or aspects thereof) may be used in combination with each other. Additionally, portions of the above-described embodiments may be removed without departing from the scope of the disclosure. In addition, modifications may be made to adapt a particular situation or material to the teachings of the various embodiments without departing from their scope. Many other embodiments will also be apparent to those of skill in the art upon reviewing the above description. The present disclosure is intended to embrace all such alternatives, modifications and variances that fall within the scope of the appended claims.

The terms "comprise" or "comprising" are to be interpreted as specifying the presence of the stated features, integers, steps or components, but not precluding the presence of one or more other features, integers, steps or components or groups thereof. The terms "a" and "an" are indefinite articles, and as such, do not preclude embodiments having pluralities of articles.

Some embodiments may be described using the expression "one embodiment" or "an embodiment" along with their derivatives. These terms mean that a particular feature, structure, or characteristic described in connection with the embodiment is included in at least one embodiment. The appearances of the phrase "an embodiment" in various places in the specification are not necessarily all referring to the same embodiment.

As a summary, several examples of the method according to the present disclosure are provided.

A first example of the method according to the present disclosure provides a method of providing a rank index (RI) filtering, including:

receiving, by one of an eNB or gNB, a rank index (RI) from a user equipment (UE);

determining, by one of the eNB or gNB, whether the UE is one of a conforming UE or a nonconforming UE, based on per-rank-based block error rate (BLER) monitored over a period; and performing at least one of i) a first type of rank filtering in case the UE is a conforming UE, and ii) a second type of rank filtering in case the UE is a nonconforming UE.

In a second example of the method modifying the first example of the method, the first type of rank filtering is configured for conforming UEs, wherein conforming UEs are defined as UEs reporting correlated RI and Channel Quality Indicator (CQI).

In a third example of the method modifying the first example of the method, the second type of rank filtering is configured for nonconforming UEs, wherein nonconforming UEs are defined as UEs reporting uncorrelated RI and CQI.

In a fourth example of the method modifying the first example of the method, at least one of: i) the UE is determined as a nonconforming UE if per-rank-based BLER is greater than the product of a predetermined target BLER and a predetermined offset; and ii) the UE is determined as a conforming UE if per-rank-based BLER is less than the product of the predetermined target BLER and the predetermined offset.

In a fifth example of the method modifying the first example of the method, the method further includes:

adjusting, by one of the eNB or gNB, the RI received from the UE to a final RI rank as part of one of the first type of rank filtering or the second type of rank filtering; and performing, by one of the eNB or gNB, Outer Loop Rate Control (OLRC) optimization in response to one of the first type of rank filtering or the second type of rank filtering, wherein the OLRC optimization reduces the final RI rank if at least one Physical Downlink Shared Channel (PDSCH) failure occurs on the UE side.

In a sixth example of the method modifying the first example of the method, the method further includes:

in case a filtered RI for a current Transmit Time Interval (TTI) is greater than a filter RI for a previous TTI, and BLER is greater than the sum of a predetermined target BLER and a predetermined offset value, reducing Modulation and Coding Scheme (MCS) index by one.

In a seventh example of the method modifying the first example of the method, the method further includes:

in case the current RI received from the UE for the current Transmit Time Interval (TTI) is greater than a previous RI received from the UE for a previous TTI, and BLER is greater than the sum of a predetermined target BLER and a predetermined offset value, reducing Modulation and Coding Scheme (MCS) index by one.

In an eight example of the method modifying the first example of the method, at least one of the first type of rank filtering and the second type of rank filtering includes:

performing infinite impulse response filtering on the RI received from the UE (UE reported RI) to produce a first filtered RI (FILTERED_RI);

calculating a rounded filtered RI (ROUNDED_FILTERED_RI) using the following function:

ROUNDED_FILTERED_RI=floor(FILTERED_RI+ 0.5);

if one of i) ROUNDED_FILTERED_RI>=3, in case the UE has 4 receivers (RXs) with a maximum RI rank of 4, or ii) ROUNDED_FILTERED_RI>=2, in case the UE has 2 receivers (RXs) with a maximum RI rank of 2, resetting the ROUNDED_FILTERED_RI to 1; and calculating a final filtered RI (FINAL_RI) using the following minimum function:

FINAL_RI=Min(ROUNDED_FILTERED_RI,UE reported RI).

In a ninth example of the method modifying the eighth example of the method, the method further includes:

for the first type of rank filtering, in case FINAL_RI for a current Transmit Time Interval (TTI) is greater than FINAL_RI for a previous TTI, and BLER is greater than the sum of a predetermined target BLER and a predetermined offset value, reducing Modulation and Coding Scheme (MCS) index by one.

In a tenth example of the method modifying the first example of the method, the method further includes:

for the second type of rank filtering, performing Modulation and Coding Scheme (MCS) adjustment, wherein said MCS adjustment includes:

in case the RI received from the UE is adjusted to a higher final RI rank, maintaining a code rate for the lower RI rank.

In an eleventh example of the method modifying the first example of the method, the second type of rank filtering includes:

performing Modulation and Coding Scheme (MCS) adjustment, wherein said MCS adjustment includes:

in case the RI received from the UE is adjusted to a different final RI rank, i) calculating new efficient bit rate (newEffBitrate) based on new target code rate (newTargetCodeRate), the final RI rank (newEffRank) and new modulation order (newModOrder), as follows:

newEffBitRate=newTargetCodeRate*newEffRank*newModOrder, and ii) calculating current efficient bit rate (currEffBitrate) based on current target code rate (currTargetCodeRate), the RI rank received from the UE (currEffRank) and current modulation order (currModOrder), as follows:

currEffBitRate=currTargetCodeRate*currEffRank*currModOrder;

determining whether the following condition is satisfied:

(newEffBitRate/currEffBitRate)−1>predetermined threshold; and if the condition is satisfied, calculating at least one of a target efficient bit rate per rank ("targetEffbitRatePerRank"), a target signal-to-interference-and-noise ratio (targetSINR) and target MCS (targetMCS), and updating current SINR (currSINR) as new SINR (newSINR), and updating code word MCS as new MCS.

In a twelfth example of the method modifying the first example of the method, the method further includes:

monitoring the per-rank-based BLER occurring over a plurality of RI-receiving periods, wherein only the RI-receiving periods in which RI rank is adjusted from a lower rank to a higher rank are monitored.

In a thirteenth example of the method modifying the sixth example of the method, the method further includes:

adjusting, by one of the eNB or gNB, the RI received from the UE to a final RI rank as part of one of the first type of rank filtering or the second type of rank filtering; and performing, by one of the eNB or gNB, Outer Loop Rate Control (OLRC) optimization in response to one of the first type of rank filtering or the second type of rank filtering, wherein the OLRC optimization reduces the final RI rank if at least one Physical Downlink Shared Channel (PDSCH) failure occurs on the UE side.

In a fourteenth example of the method modifying the first example of the method, the method further includes:

performing, by one of the eNB or gNB, Outer Loop Rate Control (OLRC) optimization in response to one of the first type of rank filtering or the second type of rank filtering, wherein the OLRC optimization includes:

calculating an OLRC offset for at least one code word when a downlink transmission shifts between one code word and two code words, wherein the one code word case has a first code word-to-layers mapping, and the two code words case has a second, different code word-to-layers mapping.

In a fifteenth example of the method modifying the fourteenth example of the method, in case RI rank is adjusted from RI rank 1 to RI rank 2 in a scenario requiring one code word for RI rank 1 and two code words for RI rank 2, one OLRC offset value for one code word for RI rank 1 is evenly divided into two equal halves used as OLRC offset values for the two code words for RI rank 2.

In a sixteenth example of the method modifying the fourteenth example of the method, in case RI rank is adjusted from RI rank 1 to RI rank 2 in a scenario requiring one code word for RI rank 1 and one code word for RI rank 2, one OLRC offset value for one code word for RI rank 1 is cut by half for use as an OLRC offset value for the code word for RI rank 2.

In a seventeenth example of the method modifying the fourteenth example of the method, in case RI rank is adjusted from RI rank 2 to RI rank 3 in a scenario requiring two code words for RI rank 2 and two code words for RI rank 3, one of two OLRC offset values for the two code words for RI rank 2 is cut by half for use as an OLRC offset value for one of the two code words for RI rank 3.

In an eighteenth example of the method modifying the fourteenth example of the method, in case RI rank is adjusted one of i) from RI rank of 2 to RI rank of 1, ii) from RI rank of 3 to RI rank of 1, or iii) from RI rank of 4 to RI rank of 1, in a scenario requiring one code word for RI rank 1 and two code words for RI rank of 2, 3 and 4, then a single OLRC offset value for one code word for RI rank 1 is determined by:

calculating a maximum code word OLRC offset (MaxCW-OLRC offset) using a maximum function of first code word OLRC offset (CW0-OLRC offset) and second code word OLRC offset (CW1-OLRC offset), as follows:

MaxCW-OLRC offset=MAX(CW0-OLRC offset, CW1-OLRC offset);

calculating a minimum code word OLRC offset (MinCW-OLRC offset) using a minimum function of first code word OLRC offset (CW0-OLRC offset) and second code word OLRC offset (CW1-OLRC offset), as follows:

MinCW-OLRC offset=MIN(CW0-OLRC offset, CW1-OLRC offset); and calculating the single OLRC offset (CW OLRC offset) value for one code word for RI rank 1 as follows:

CW OLRC offset=(MaxCW-OLRC offset/2)+ (MinCW-OLRC offset/2).

Glossary of Terms

Reference is made to Third Generation Partnership Project (3GPP) system, in accordance with embodiments of the present disclosure. The present disclosure employs abbreviations, terms and technology defined in accordance with Third Generation Partnership Project (3GPP) technology standards, including the following standards and definitions. 3GPP technical specifications (TS) and technical reports (TR), which are incorporated by reference in their entirety hereby, define the related terms and architecture reference models that follow.

- 3GPP: Third generation partnership project
- KPI—Key Performance Indicator
- SR—Scheduling Request
  - BSR—Buffer Status Report
  - PHR—Power Headroom Report
- UL—Uplink
- DL—Downlink
- UE—User Equipment
- PUCCH—Physical Uplink Control Channel
- eNB—Evolved NodeB
- MAC—Medium Access Control
- MCS—Modulation and Coding Scheme
- TPC—Transmit Power Control
- HARQ—Hybrid Automatic Repeat Request
- TTI—Transmit Time Internal
- CU—Centralized Unit
- DU—Distributed Unit
- IP—Internet Protocol
- SFN—System Frame Number
- PUSCH—Physical Uplink Shared Channel.
- DCI—Downlink Control Information
- SF—Subframe Number
- LTE—Long Time Evolution
- NR—New Radio
- ACK—Acknowledgement
- NACK—Negative Acknowledgement
- LCID—Logical Channel Identifier
- RV—Redundancy Version
- CRC—Cyclic Redundancy Check
- BWP—Bandwidth Part
- CBG—Code Block Groups
- TB—Transport Block.
- gNB—Next generation nodeB
- OLRC—Outer Loop Rate Control
- PRB—Physical Resource Block
- L3—Layer-3
- App—Application
- QoE—Quality of Experience
- RTT—Round Trip Time
- PDU—Protocol Data Unit
- BO—Buffer Occupancy
- RI—Rank Indicator
- BLER—Block Error Rate
- SINR—Signal to Interference and Noise Ratio
- DCI—Downlink Control Information
- PDSCH—Physical Downlink Shared Channel
- 2Rx—Two Receiver Antennas
- 4Rx—Four Receiver Antennas
- 2Tx—Two Transmit Antennas
- 4Tx—Four Transmit Antennas
- 2T2R—Two Transmit Two Receive Antennas
- 4T4R—Four Transmit Four Receive Antennas
- MIMO—Multiple Input Multiple Output
- CQI—Channel Quality Indicator
- QAM—Quadrature Amplitude Modulation
- QPSK—Quadrature Phase Shift Keying
- iMcs=$i^{th}$ Modulation and Coding Scheme
- iTbs=$i^{th}$ Transport Block Size
- IIR—Infinite Impulse Response
- CW—Code word
- TD—Transmit Diversity
- CRNTI—Cell Radio Network Temporary Identifier
- ID—Identifier
- RRC—Radio Resource Control
- PMI—Precoding Matrix Indicator
- TM4—Transmission Mode 4
- 3GPP—3rd Generation Partnership Project

The invention claimed is:

1. A method of providing a rank index (RI) filtering, comprising:
   - receiving, by one of an eNB or gNB, a rank index (RI) from a user equipment (UE);
   - determining, by one of the eNB or gNB, whether the UE is one of a conforming UE or a nonconforming UE, based on per-rank-based block error rate (BLER) monitored over a period; and
   - performing at least one of i) a first type of rank filtering in case the UE is a conforming UE, and ii) a second type of rank filtering in case the UE is a nonconforming UE.

2. The method of claim 1, wherein the first type of rank filtering is configured for conforming UEs, wherein conforming UEs are defined as UEs reporting correlated RI and Channel Quality Indicator (CQI).

3. The method of claim 1, wherein the second type of rank filtering is configured for nonconforming UEs, wherein nonconforming UEs are defined as UEs reporting uncorrelated RI and CQI.

4. The method of claim 1, wherein at least one of:
i) the UE is determined as a nonconforming UE if per-rank-based BLER is greater than the product of a predetermined target BLER and a predetermined offset; and
ii) the UE is determined as a conforming UE if per-rank-based BLER is less than the product of the predetermined target BLER and the predetermined offset.

5. The method of claim 1, the method further comprising:
adjusting, by one of the eNB or gNB, the RI received from the UE to a final RI rank as part of one of the first type of rank filtering or the second type of rank filtering; and
performing, by one of the eNB or gNB, Outer Loop Rate Control (OLRC) optimization in response to one of the first type of rank filtering or the second type of rank filtering, wherein the OLRC optimization reduces the final RI rank if at least one Physical Downlink Shared Channel (PDSCH) failure occurs on the UE side.

6. The method of claim 1, further comprising:
in case a filtered RI for a current Transmit Time Interval (TTI) is greater than a filter RI for a previous TTI, and BLER is greater than the sum of a predetermined target BLER and a predetermined offset value, reducing Modulation and Coding Scheme (MCS) index by one.

7. The method of claim 1, further comprising:
in case a current RI received from the UE for a current Transmit Time Interval (TTI) is greater than a previous RI received from the UE for a previous TTI, and BLER is greater than the sum of a predetermined target BLER and a predetermined offset value, reducing Modulation and Coding Scheme (MCS) index by one.

8. The method of claim 1, wherein at least one of the first type of rank filtering and the second type of rank filtering comprises:
performing infinite impulse response filtering on the RI received from the UE (UE reported RI) to produce a first filtered RI (FILTERED_RI);
calculating a rounded filtered RI (ROUNDED_FILTERED_RI) using the following function:
ROUNDED FILTERED RI=floor (FILTERED_RI+0.5);
if one of i) ROUNDED_FILTERED_RI>=3, in case the UE has 4 receivers (RXs) with a maximum RI rank of 4, or ii) ROUNDED FILTERED RI>=2, in case the UE has 2 receivers (RXs) with a maximum RI rank of 2, resetting the ROUNDED_FILTERED_RI to 1; and
calculating a final filtered RI (FINAL_RI) using the following minimum function:
FINAL RI=Min (ROUNDED FILTERED_RI, UE reported RI).

9. The method of claim 8, further comprising:
for the first type of rank filtering, in case FINAL RI for a current Transmit Time Interval (TTI) is greater than FINAL_RI for a previous TTI, and BLER is greater than the sum of a predetermined target BLER and a predetermined offset value, reducing Modulation and Coding Scheme (MCS) index by one.

10. The method of claim 1, further comprising:
for the second type of rank filtering, performing Modulation and Coding Scheme (MCS) adjustment, wherein said MCS adjustment includes:
in case the RI received from the UE is adjusted to a higher final RI rank, maintaining a code rate for a lower RI rank.

11. The method of claim 1, wherein the second type of rank filtering comprises:
performing Modulation and Coding Scheme (MCS) adjustment, wherein said MCS adjustment includes:
in case the RI received from the UE is adjusted to a different final RI rank,
i) calculating new efficient bit rate (newEffBitrate) based on new target code rate (newTargetCodeRate), the final RI rank (newEffRank) and new modulation order (newModOrder), as follows:

newEffBitRate=newTargetCodeRate*newEffRank*newModOrder, and
ii) calculating current efficient bit rate (currEffBitrate) based on current target code rate (currTargetCodeRate), the RI rank received from the UE (currEffRank) and current modulation order (currModOrder), as follows:

currEffBitRate=currTargetCodeRate*currEffRank*currModOrder;

determining whether the following condition is satisfied:

(newEffBitRate/currEffBitRate)−1>predetermined threshold; and if the condition is satisfied,
calculating at least one of a target efficient bit rate per rank
("targetEffbitRatePerRank"), a target signal-to-interference-and-noise ratio (targetSINR) and target MCS (targetMCS), and
updating current SINR (currSINR) as new SINR (newSINR), and updating code word MCS as new MCS.

12. The method of claim 1, further comprising:
monitoring the per-rank-based BLER occurring over a plurality of RI-receiving periods, wherein only the RI-receiving periods in which RI rank is adjusted from a lower rank to a higher rank are monitored.

13. The method of claim 6, further comprising:
adjusting, by one of the eNB or gNB, the RI received from the UE to a final RI rank as part of one of the first type of rank filtering or the second type of rank filtering; and
performing, by one of the eNB or gNB, Outer Loop Rate Control (OLRC) optimization in response to one of the first type of rank filtering or the second type of rank filtering, wherein the OLRC optimization reduces the final RI rank if at least one Physical Downlink Shared Channel (PDSCH) failure occurs on the UE side.

14. The method of claim 1, further comprising:
performing, by one of the eNB or gNB, Outer Loop Rate Control (OLRC) optimization in response to one of the first type of rank filtering or the second type of rank filtering, wherein the OLRC optimization includes:
calculating an OLRC offset for at least one code word when a downlink transmission shifts between one code word and two code words, wherein the one code word case has a first code word-to-layers mapping, and the two code words case has a second, different code word-to-layers mapping.

15. The method of claim 14, wherein:
in case RI rank is adjusted from RI rank 1 to RI rank 2 in a scenario requiring one code word for RI rank 1 and two code words for RI rank 2, one OLRC offset value for one code word for RI rank 1 is evenly divided into two equal halves used as OLRC offset values for the two code words for RI rank 2.

16. The method of claim 14, wherein:
in case RI rank is adjusted from RI rank 1 to RI rank 2 in a scenario requiring one code word for RI rank 1 and one code word for RI rank 2, one OLRC offset value for one code word for RI rank 1 is cut by half for use as an OLRC offset value for the code word for RI rank 2.

17. The method of claim 14, wherein:
in case RI rank is adjusted from RI rank 2 to RI rank 3 in a scenario requiring two code words for RI rank 2 and two code words for RI rank 3, one of two OLRC offset values for the two code words for RI rank 2 is cut by half for use as an OLRC offset value for one of the two code words for RI rank 3.

18. The method of claim 14, wherein:
in case RI rank is adjusted one of i) from RI rank of 2 to RI rank of 1, ii) from RI rank of 3 to RI rank of 1, or iii) from RI rank of 4 to RI rank of 1, in a scenario requiring one code word for RI rank 1 and two code words for RI rank of 2, 3 and 4, then a single OLRC offset value for one code word for RI rank 1 is determined by:

calculating a maximum code word OLRC offset (MaxCW-OLRC offset) using a maximum function of first code word OLRC offset (CW0-OLRC offset) and second code word OLRC offset (CW1-OLRC offset), as follows:

$$\text{MaxCW-OLRC offset} = \text{MAX}(\text{CW0-OLRC offset}, \text{CW1-OLRC offset});$$

calculating a minimum code word OLRC offset (MinCW-OLRC offset) using a minimum function of first code word OLRC offset (CW0-OLRC offset) and second code word OLRC offset (CW1-OLRC offset), as follows:

$$\text{MinCW-OLRC offset} = \text{MIN}(\text{CW0-OLRC offset}, \text{CW1-OLRC offset}); \text{ and}$$

calculating the single OLRC offset (CW OLRC offset) value for one code word for RI rank 1 as follows:

$$\text{CW OLRC offset} = (\text{MaxCW-OLRC offset}/2) + (\text{MinCW-OLRC offset}/2).$$

* * * * *